United States Patent [19]

Bergman

[11] Patent Number: 5,609,678

[45] Date of Patent: Mar. 11, 1997

[54] PAINT SOLVENT WITH GLYCOL ETHER, OXIDIZING OIL, PROPYLENE GLYCOL OR PROPYLENE CARBONATE, AND NMP OR ISOALKANE

[75] Inventor: Leo M. Bergman, Portland, Oreg.

[73] Assignee: American Color Company, Portland, Me.

[21] Appl. No.: 438,188

[22] Filed: May 9, 1995

Related U.S. Application Data

[63] Continuation-in-part of Ser. No. 50,504, Apr. 20, 1993, abandoned.

[51] Int. Cl.$^6$ ............... C08K 5/05; C08K 5/06; C08K 5/3415; C11D 7/26
[52] U.S. Cl. ............... 106/311; 252/364; 510/213; 510/201; 510/211; 510/212; 510/407; 510/437; 510/491; 510/501; 510/506; 510/500; 510/463
[58] Field of Search ............... 252/542, 153, 252/162, 170, 171, 364, DIG. 8; 137/38; 106/311; 510/213, 201, 211, 212, 407, 437, 491, 501, 506, 500, 463

[56] References Cited

U.S. PATENT DOCUMENTS

| | | | |
|---|---|---|---|
| 2,935,479 | 5/1960 | Oberdorfer | 252/170 |
| 3,382,181 | 5/1968 | Oberdorfer | 252/170 |
| 3,751,970 | 8/1973 | Alburger | 73/36 |
| 3,929,664 | 12/1975 | Alburger | 252/301.2 P |
| 4,822,514 | 4/1989 | Becker | 252/108 |
| 4,836,950 | 6/1989 | Madgen et al. | 252/153 |
| 4,859,359 | 8/1989 | DeMatteo et al. | 252/174.15 |
| 4,923,760 | 5/1990 | Adkins et al. | 428/541 |
| 5,011,621 | 4/1991 | Sullivan | 252/162 |
| 5,143,639 | 9/1992 | Krawack | 252/162 |
| 5,167,853 | 12/1992 | Stevens | 252/162 |
| 5,310,996 | 5/1994 | Taylor | 252/171 |
| 5,332,526 | 7/1994 | Stanley | 252/542 |
| 5,334,256 | 8/1994 | Howe | 252/170 |
| 5,370,817 | 12/1994 | Weltman et al. | 252/170 |
| 5,372,742 | 12/1994 | Bayless | 510/213 X |
| 5,449,474 | 9/1995 | Lucas et al. | 252/170 |
| 5,472,631 | 12/1995 | Harris | 510/213 X |

OTHER PUBLICATIONS

ACS Registry No. 29911-27-1, one page printout.
ACS Registry No. 872-50-4, two page printout.
Schuerman, George, et al., "Chemistry of Paint", J. Chem. Educ., 66(4), 327-8. (Month not known.).

*Primary Examiner*—Douglas J. McGinty
*Attorney, Agent, or Firm*—Chris A. Caseiro; Thomas L. Bohan

[57] ABSTRACT

Solvent formulations used in thinning oil-based resins and in cleaning equipment contaminated with oil-based resins include mixtures of constituents with low-, or no-toxicity and flash points generally considered to be above flammability levels. The formulations are compatible with such resins and further have drying characteristics suitable for most users. The solvating power and drying characteristics of these formulations are equivalent to turpentine and mineral spirits, but without the safety concerns associated with those thinners. The formulation components of the present invention include propylene glycol ethers comprising no more than 60% by weight of the solvent mixture, no more than 10% by weight of an isoalkane compound, and no more than 30% by weight of an oxidizing oil, and no more than 30% by weight of an odor-masking compound, preferably d-limonene. Further optional constituents include no more than 15% by weight of propylene glycol, no more than 20% by weight of isopropyl alcohol or ethyl alcohol, and no more than 10% by weight of an isoalkane compound.

8 Claims, No Drawings

PAINT SOLVENT WITH GLYCOL ETHER, OXIDIZING OIL, PROPYLENE GLYCOL OR PROPYLENE CARBONATE, AND NMP OR ISOALKANE

This is a continuation-in-part of application Ser. No. 050,505, filed Apr. 20, 1993, now abandoned.

BACKGROUND OF THE INVENTION

1. Field of the Invention

This invention relates to multicomponent solvents formulated for use as cleaning agents and diluents with low or no toxicity and non-flammable or non-combustible characteristics. More particularly, the present invention relates to multicomponent solvents formulated to be miscible with oil-, and resin-based paints, but is not limited thereto. The solvents of the present invention act as cleaners of, and thinners for, such paints, with minimal effect on the desired properties of the paint, while maintaining the noted safety features.

2. Description of The Prior Art

In the field of solvents, and, in particular, paint solvents used to thin or otherwise dilute the paint resin or binder, there has been a long history of use of compounds and compositions with less-than-desirable health and safety characteristics. Of course, the hazards of such solvents were not well known and in any case, suitable, inexpensive alternatives were few and far between. The situation remains basically the same today. As a result, solvents that were used long ago continue to remain in use. Specifically, there exists in primary use today thinning compounds known generically as turpentine and "mineral spirits." Both compounds have desirable properties in that they are miscible with many commercially-available oil-based paints and they are relatively non-hazardous. That characterization is of course dependent upon comparing those solvents with suitable alternatives.

There are several methods used to define a satisfactory solvent. Two of the more widely-used techniques include the Kauri-butanol test, conducted under American Society of Testing and Materials (ASTM) D-1133, and a Solubility Parameter evaluation. The Kauri-butanol test provides a relative measure of the solvency of a compound or mixture when that compound or mixture is added to a standard solution of kauri resin in butanol. For the most part, the higher the value, the greater the solvating capacity of the solvent. In general, a kauri-butanol ($K_B$) value of less than 32 indicates a compound with poor solvency characteristics, at least for oil-based resins, while a $K_B$ value above 90 indicates good solvency for such resins.

The measure of the solvency characteristics of a compound or mixture under the solubility parameter evaluation is actually a determination based upon the inherent characteristics of the material rather than its interaction with another compound. The solubility parameter is based on the heat of vaporization of the material, a property available in the appropriate technical literature for many solvents. This parameter is perhaps more useful in determining the relative solvency of a wider array of compounds than is the kauri-butanol test. Under this measure, a high value tends to indicate a solvent suitable for use with polar compounds, while a lower number tends to indicate that the solvent can be used to dilute non-polar compounds. Water, for example, has a solubility parameter of 23.4, while mineral spirits has a value of 6.9.

Another measure of the suitability of a particular solvent with a particular resin is its evaporation rate. This rate determines the speed with which a solvent-thinned paint, for example, will dry after application. Depending upon the desired drying rate for the resin, one solvent may be more useful than another. In general, a highly-evaporative solvent will produce faster resin drying. Of course, that drying rate is a function of temperature. It should also be noted that those solvents with relatively high evaporation rates, such as mineral spirits, also tend to have lower flash points and therefore present flammability hazards.

Of the two paint solvents most commonly used, turpentine and mineral spirits, turpentine was the first one in wide use. Turpentine is an essential oil of the naturally-occurring terpene family, consisting principally of alpha-pinene. Broadly stated, its characteristics include: 1) good miscibility with an array of commonly-used paint resins; 2) a suitable evaporation rate, providing sufficient time to easily apply the resin and a reasonable drying time; 3) a flash point (the temperature at which the vapor space just above the compound will ignite) that is higher than offer available solvents; and 4) an odor that is not completely unpleasant. However, in spite of the noted advantages, there are problems with turpentine, including its flash point (only about 90° F.) and an undesirable level of toxicity, that have made the search for substitutes an urgent one.

For a number of years mineral spirits have been used as substitutes for turpentine-primarily on the basis of lower cost and greater availability, rather than on any improvement in flash point or toxicity. The solubility parameter associated with mineral spirits is slightly less than that of turpentine (6.9 versus 8.1) though well within the values evidencing suitable solubility for oil-based resins. Mineral spirits (or white spirits) is a term used to designate a wide class of petroleum-based aliphatic-hydrocarbon solvents in the C10–C15 range that boil at temperatures greater than 300° F. Due to the abundance of petroleum, lower-priced mineral spirits have, to a great extent, replaced turpentine as oil-based-paint solvents. Of course, in the generic class of petroleum-based solvents there are a range of compounds with varying characteristics. In spite of their noted usefulness in providing good thinning for oil-based paints, there is a continuing push to reduce direct human contact with hydrocarbons generally, given recent observations that such compounds tend to be carcinogenic.

In addition to mineral spirits, there are the lighter aliphatics, such as the hexanes and octanes that evaporate more quickly and/or are more compatible with particular resins. To a certain extent, these compounds may make up a fraction of the generic mineral spirits solvent. However, in some specific cases they may be used directly as solvents in and of themselves. A wide range of aromatic hydrocarbons, including toluene and xylene, are also considered useful solvents, particularly for oil-based paints that have aromatics as constituents. Of course, the hazards associated with these aromatics are at least as well-known as those observed with the other hydrocarbons. In fact, enactment of the Clean Air Act of 1990 has restricted the use of such solvents, among many others. As a result, they are little used as thinners or cleaners by private individuals. Nevertheless, on occasion, they do make up at least a small portion of the mixtures used as thinners, including those designated as mineral spirits.

In spite of the well-known hazards associated with the aliphatic and aromatic hydrocarbon solvents, including their relatively-low flash points, they continue to be used as thinners and cleaners for a variety of paints. Of course, these solvents, along with turpentine, are inadequate for paints that are not oil- or resin-based—typically the cellulose-derived materials known generically as lacquers (resins derived from plants and fossilized material). As a result, other solvents are used to perform the same functions undertaken by the noted compounds and mixtures. For example, the solvents used to thin shellacs (insect-produced resins) are alcohol-based, the solvents commonly used to thin nitrocellulosic substances are esters. Ketones are often used as solvents for acrylic and vinyl resins. Again, while useful in thinning and cleaning a range of resins, these various oxygenated solvents suffer the same deficiencies associated with turpentine, mineral spirits, and the other hydrocarbon solvents. Those deficiencies are, primarily, unacceptable levels of toxicity and low flash points. It has been observed that mixing relatively dissimilar solvents, such as combining a hydrocarbon with an oxygenated solvent, can result in a single solvent mixture with average solubility and evaporation rate, useable with dissimilar resin types. However, such mixtures may still suffer the deficiencies of the individual constituents.

As noted, one principal concern with a wide array of solvents involves the possibility that the vapor space above the particular liquid will ignite under certain conditions. In order to support such ignition, a sufficient quantity of the solvent's vapor must be present in combination with oxygen. One measure used to define the temperature at which a combustible mixture of oxygen with the vapor of a particular solvent will support ignition is the flash point. The flash point is the temperature at which the solvent's vapor pressure is sufficient to produce a flame in the present of an ignitor. Low flash points generally indicate a greater likelihood that ignition will occur. Generally, they also indicate that evaporation will occur sooner than with high-flash-point solvents. Under U.S. Department of Transportation standards, a solvent is considered: 1) flammable if it has a flash point below 135° F.; 2) non-flammable, but combustible if it has a flash point in the range 135° F.–175° F.; and 3) non-combustible if it has a flash point greater than 175° F. In simple terms under these definitions, a flammable compound is one that can ignite under ambient conditions that can occur naturally and that are to be expected during transport, while a combustible compound is one that can ignite under unlikely but possible transportation conditions. There are some suitable oil-based solvents that can be considered non-flammable, such as heavy aliphatic- and aromatic-hydrocarbons. Even fewer can be considered non-combustible.

One attempt at fixing the flammability problem noted for many solvents involved the use of chlorinated and/or fluorinated hydrocarbons either as substitutes for those earlier solvents, or as constituents in mixtures containing the earlier solvents. The high flash points of these halogenated hydrocarbons, which include methylene chloride and trichloroethylene, among others, translate into a significant reduction in the flammability of the solvent. However, the commonly-used halogenated hydrocarbons are generally considered to be more toxic than the earlier solvents. In fact, many are deemed to be carcinogenic. Moreover, the deleterious affect of the highly-volatile chlorinated solvents, and chlorofluorocarbons in particular, on the ozone layer is well documented.

Apart from this failed attempt to provide solvents with both good solvating characteristics for resins of interest and low-, or non-flammability, the toxicity of such compounds has always been considered at first an unknown, and then later, a necessary evil. Toxicities of many substances, including solvents, are most commonly defined either by their Threshold Limit Value (TLV) or by LD50 Test results. TLV is the quantity of a compound that a person can be exposed to over a given period of time without adverse health effects. The time period is typically defined as an 8-hour work day and the values are measured in parts of the vapor of the compound per million parts of air containing the vapor, at standard temperature and pressure. Under Occupational Safety & Health Administration regulations, a low TLV number (e.g., less than 100 ppm) indicates a toxic compound, whereas a high TLV (e.g., greater than 100 ppm) indicates reduced toxicity. Turpentine, for example, has a TLV of 100 ppm, while mineral spirits have TLV values higher than that.

The LD50 Test, on the other hand, involves the introduction of the compound into a living organism, by ingestion, inhalation, injection, or the like, and observation of whether death occurs within a specified period of time. While a variety of organisms may be evaluated, one of the more commonly used is a laboratory white rat. Under the Federal Hazardous Substance Act (FHSA), a substance is considered toxic if at least one-half of the rats in a test die within ten days of receiving the substance and they have received at least five grams per kilogram of the animal's body weight. Of course, when at least half die within the noted time period after receiving less than five grams/kilogram, the substance is also deemed to be toxic. If fewer than half the rats die over the ten-day period after receiving at least 5 grams/kilogram, the substance is, by FHSA definition, non-toxic. Typically, the number of rats observed in a test group is ten.

A further characteristic considered to be important by paint thinner users—particularly those users who work in close proximity to the paint source, such as artists, for example—is the odor of the mixture in use. At first that may not seem to be a significant factor, in light of flammability and toxicity concerns. However, when one is exposed to an offensive odor for an extended period of time, that characteristic becomes increasingly significant. Therefore, many prior-art solvents, while effective thinners and cleaning agents, either are simply too offensive, or they require the addition of odor maskers—generally compounds that are compatible with the particular solvent and that also provide a not unpleasant odor. One such substance commonly used in masking is d-limonene, a naturally-occurring compound in the same terpene family as turpentine. It has a lemon odor and solvating characteristics for some natural resins. However, it does have a flash point slightly below that of turpentine.

Therefore, there exists a need for solvents that can be used to improve the applicability, or "spreadability," of resins, and oil-based paints in particular, on surfaces of interest; that is, solvents—as well as solvent mixtures—that can be used to thin such resins without significantly affecting the ultimate properties of the dried resins. Of course, an accompanying feature of such solvents is the ability to use them to clean items in contact with the undried resins when the solvents are used in excess.

Further, there exists a need for such solvents with evaporation rates that are compatible with the drying of the particular resins. In other words, such solvents must not evaporate too quickly so as to cause the resins to crack upon drying; nor must they evaporate too slowly so as to prevent drying of the resins. There also exists a need for such solvents with very little, if any, unpleasant odor emissions, particularly when the resin to be thinned is used in close quarters.

Still further, there exists a need for such solvents with low-, or no-toxicity, as defined under standards such as TLV ratings or LD50 values. Yet further, there exists a need for such solvents with all of the above-noted characteristics as well as having a composition that renders them non-flammable or, ideally, non-combustible.

SUMMARY OF THE INVENTION

It is an object of the present invention to provide solvents suitable as thinners and cleaners for a wide array of resins—oil-based paints in particular—with little, if any, effect on the characteristics of such resins. Such suitability to be defined by the miscibility and observed compatibility of the formulated solvents with such resins, as well as the solvents' effect on the drying rate of the resins. It is also an object of the present invention to provide solvents with the noted characteristics and that also produce little, if any, unpleasant odor emissions, particularly for resins located in close proximity to the user. It is yet another object of the present invention to provide solvents with the noted characteristics and that are further deemed to be non-toxic. It is still another object of the present invention to provide solvents with all of the above-noted characteristics and that are yet further rated as non-flammable or non-combustible. There is no single solvent compound of which the inventor is presently aware that: 1) is soluble with oil-based resins in particular; 2) has a desirable evaporation rate for good drying of the resin after application; 3) meets generally-accepted standards for compounds that can be defined as having low-, or no-toxicity; and 4) is defined as non-flammable or non-combustible. There are many solvents with two or three of these characteristics, but none with all four.

The noted and other objectives are achieved in the present invention through the novel combination of a plurality of known compounds. The particular goal of the present invention is to first start with a solvent known to be compatible with an array of oil-based resins commonly used by artists, painters, and other individuals who work in close proximity with the resin mixture that is in use. That is not to say that the solvent formulations to be described will be useful only in those fields; rather, the original research on the subject of the invention was conducted with such people in mind. It has been observed, however, that the benefits of the formulations of the present invention extend to other solvent users. Next, the negative characteristics associated with such known solvents are, in effect, "diluted" to acceptable levels without dilution of the desirable solubility and evaporative characteristics noted.

It has been discovered through much experimentation that a variety of co-solvents and/or fillers will act as suitable diluents. Of course, the extent of their use is dependent upon the starting solvent. Initially, the present invention involves starting with no more than 60% by weight of a propylene carbonate compound, an ethylene glycol ether compound, a propylene glycol ether compound, or alternatively, a propylether acetate compound as the primary solvent. These starter solvent compound groups, while having low evaporation rates relative to other potential solvent starters, have good solubility with a wide variety of resin systems, particularly the cellulose-based resins. This can be said for the mono-ethylene and the mono-propylene as well as multiple ethylenes and propylenes of both compound types. Particular glycol groups to be used include ethylene glycol monomethyl ether, diethylene glycol monomethyl ether, ethylene glycol monobutyl ether, diethylene monobutyl ether, propylene glycol phenyl ether, dipropylene glycol N-propyl ether propylene glycol monomethyl ether, propylene glycol monopropyl ether, dipropylene glycol monopropyl ether, propylene glycol monobutyl ether, and dipropylene glycol monobutyl ether. Carbitol groups including the butyl carbitols and methyl carbitols are also considered suitable starters. It has been observed that several of the propylene glycols available from Dow Chemical Corp., Midland, Mich., under the Dowanol® tradename have been found to be suitable starter solvents. It is important to note that these starter solvents have relatively high flash points, indicating non-flammable characteristics. However, most of them fail to meet the LD50 Test standards for non-toxicity. Those that do not fail are generally unacceptable in terms of solubility with commonly-available resin systems and/or have very slow evaporation rates. Many aliphatic esters and ketones have also been reviewed as possible starter solvents; however, they have low flash points, relatively-high toxicity, and they give off particularly unpleasant odors.

In order to overcome deficiencies in the starter solvent compounds set out above, a number of other fillers and/or "co-solvents" are added to the particular starter solvent selected. The co-solvents can be defined as those compounds that are actively involved in the reduction of resin viscosity by effectively "dissolving" the resin in the solvent to form a homogeneous mixture. The fillers, on the other hand, have properties similar to the resin system, such as viscosity and compatibility with other compounds, but they do not act to dissolve the resin. It is to be noted that a compound may act as a filler for one or a number of types of resins, while also acting as a solvent for others. Thus, in considering a compound for solvency it is necessary to select compounds that will enhance the applicability of the resin, without sacrificing, to a great extent, the resins' drying rates. In considering a filler, the basis for acceptability is that of not hindering the desired application characteristics while at the same time acting to bring the complete solvent mixture to 100% by weight. Ideally, a solvent formulation would include compounds that alternatively acted as co-solvents and fillers, dependent upon the resin system used. As a basis for evaluating the mixtures produced, the applicability and drying characteristics of turpentine- and mineral-spirits-thinned resins were used as standards.

To that end, and first regarding co-solvents for the starter solvents described above, many different types can be used—in particular, some petroleum-derived hydrocarbons, because of their low cost and compatibility with oil-based resins. Isoalkenes have been found useful, due to the varying evaporation rates associated with the compounds in that class of hydrocarbons. They also give off little odor. However, due to the health concerns noted regarding hydrocarbons in general, they must be limited to less than 10% by weight of a total solvent mixture. The isoalkane identified as Isopar L™, available from the Exxon Company USA, Houston, Tex., has been found a suitable co-solvent in that regard. Isoalkanes of the type corresponding to Isopar L™ are the $C_{10}$–$C_{12}$ isoalkanes. Isoalkanes of the type corresponding to Isopar L™ are the $C_{10}$–$C_{12}$ isoalkanes. In addition, alkyl acetates such as the isodecyl acetates available from the Exxon Corporation under the Exxate™ tradename, including, but not limited to, Exxate 1000™, as well as the oxy-alcohol esters and N-methyl pyrrolidone and their equivalents are also well-known suitable co-solvents. It has been noted that N-methyl pyrrolidone is compatible with a wide array of solvents and resins, including some water-based materials. It and its analogues are particularly useful in solvent mixtures used for many types of resins.

Compounds that have been evaluated to act as fillers for solvents used to reduce the viscosities of oil-based resins include propylene glycol, dipropylene glycol and propylene carbonate. To a limited extent these compounds do not affect the applicability of the resin in solution. They are beneficial in that they have compatible evaporation rates, low-, or no-toxicity, and they are non-flammable. It has been determined that for such resins the glycols described may be as much as 40% by weight of the total solvent formulation.

A number of alcohols have also been evaluated as suitable fillers. As noted, fillers can alternatively act as solvents, dependent upon the particular resin. This is particularly true for alcohols. It is well known that for shellacs and ethylcellulose, alcohols can be used to reduce resin viscosity for enhanced applicability, and so they act more as solvents. Furthermore, the alcohols are suitable as fillers for the oil-based resins in that they have suitable evaporation rates. Particular alcohols deemed to be useful in this application include isopropyl alcohol and ethyl alcohol. Of course, it is to be understood that denatured alcohol is not to be used, given its poisonous effects. In addition, it has been observed that alcohols used as fillers with the starter solvents noted must be limited to no more than 20% by weight of the mixture.

Another filler type to be used is the group of compounds known generally as oxidizing oils. Of course, it is well known in the field of artists' paint formulations that the term oxidizing oils describes those naturally-occurring oils that are sometimes referred to as vegetable oils. They are useful with oil-based resins and alkyds. Specific oxidizing oils include safflower, poppyseed, linseed, and sunflower, among others. These oxidizing oils—which tend to be the foundational compounds in most of the naturally-occurring paints—act as fillers in that they do not act to reduce the viscosity of the resins. However, the use of one or more of the noted oxidizing oils in a solvent formulation significantly reduces the toxicity and flammability of that formulation in that they are non-toxic and they have flash points that define them as non-combustible. However, their usefulness is limited because of slow evaporation rates and an undesired affect on the viscosity of the entire mixture. As a result, it has been observed that oxidizing oils must make up no more than 30% of the total solvent formulation, by weight.

Finally, when desired, an odor masking compound can be included in the formulation. The use of an odor masker, preferably a natural one such as d-limonene, is dependent upon the type of resin to be diluted and the other components in the particular formulation. With regard to the oil-based paints, d-limonene, a member of the terpene family (like turpentine), acts as a compatible co-solvent, in addition to being an odor masker. In non-oil-based resin systems, it is a filler. In both cases its lemon scent masks the odor of the more unpleasant compounds in a mixture, most notably the aromatics. However, its low flash point, like that of turpentine, renders it a flammable component. Moreover, its LD50 Test value indicates that it is toxic. For these reasons, its proportion in a suitable solvent must be in the range 0–30% by weight of the total mixture.

In summary, a key to the present invention is to utilize a starter solvent of the propylene glycol ether, ethylene glycol ether, or propyl ether acetate type, comprising no more than 60% by weight of the total solvent formulation mixture. Each of the remaining components making up the other 40% or more of the formulation must be miscible with the other components and they must be compatible with the resin system to be diluted. The other components must also aid in increasing the flash point of the mixture so that the particular mixture is either non-flammable, or preferably, noncombustible. Further, they must also aid in reducing the toxicity of the starter solvent, to the point that the solvent formulation prepared is non-toxic. Therefore, the present invention is directed to making trade-offs in the various characteristics of particular solvent mixtures by regulating the quantity of specific constituents in those mixtures.

As previously indicated, the solvent formulations of the present invention are to be used to dilute, in effect, a wide array of resin systems. It is well known that solvents are used in this way for a variety of reasons. In the field of oil-based paints they are used as thinners to make paint application much easier. They are also used to clean the applicators used to apply the paint to various surfaces. Of course, this includes the cleaning of paint brushes. Such solvents can also be used to clean equipment, surfaces, or most anything else in contact with the paint. Of course, the underlying function of solvents remains the same in all of these methods of use; that is, to dilute the resin involved. The solvent formulations of the present invention are improved substitutes for prior-art solvents used for all of these purposes. Not only do the formulations described herein decrease the viscosity of paint, and other oil-based resins, they are safer than those earlier solvent compositions, in terms of toxicity and/or flammability.

These and other features, aspects, and advantages of the present invention will become better understood with reference to the following description of preferred embodiments and appended claims.

DESCRIPTION OF PREFERRED EMBODIMENTS

The solvent formulations of the present invention yield compositions that are soluble with oil-based resins, and in particular, those resins comprising the paints utilized by artists. While that was the focus of the evaluation and formulations considered, it is to be understood that the mixtures described herein may be used in a variety of applications, beyond their effectiveness in thinning paints and cleaning paint brushes, for example.

As previously noted, the key observations made in the evaluations of the formulations produced involved the compatibility of the particular solvent mixture with oil-based resins of interest, as well as the toxicity and flammability ratings of those mixtures. Regarding resin compatibility, the formulated solvents were added to artists' paints such as Pre-Test, available from Grumbacher, Cranbury, N.J., and Winton™ available from Windsor Newton, London, England, in mix ratios usually used by such individuals. It has been observed that those mix ratios can range from a few drops of thinner to close to 40–50% of the total mix by weight. For the purpose of the evaluations conducted herein, two mix ratios were used—a few parts per hundred of the paint and about 20% by weight. The two compounds were mixed together using standard mixing procedures. The paint/solvent mixture was visually observed to determine whether the paint had effectively dissolved in the paint; that is, whether the mixture was uniform. Once it was determined that there was uniformity, the mixture was applied to a canvas using a commercially-available paint brush. The ease with which the mixture flowed from the brush to the canvas was observed and noted. Immediately thereafter, the thickness of the applied mixture was built up to a thickness of about $\frac{1}{16}$-inch for the mixtures having only a few drops of solvent, and to about 10 to 15 mils for the mixtures having considerably more thinner component. The applied mixtures were periodically inspected for dryness, in order to determine the evaporation rate of the particular solvent formulation under evaluation. A mixture was considered to be satisfactory if it dried to the touch within the same period of time required to dry the same paint thinned with turpentine. Further tests conducted on the example formulations presented below included the Setaflash flash test and the LD50 Test described in the Background section of this application. The following solvent formulations were examined, with the results noted.

EXAMPLE 1

| Compound | Weight Percent |
| --- | --- |
| Dipropylene Glycol Monobutyl Ether | 70 |
| ISOPAR L | 8 |
| Propylene Glycol | 12 |
| Isopropyl Alcohol | 10 |

This formulation had good solvating power with the identified paint compound, it was easily applied to the test board, and it dried within approximately the same period of time required to dry the same paint thinned with an equivalent quantity of turpentine. However, it had an LD50 value of >5 gm/kg. The flash point was about 175° F.

EXAMPLE 2

| Compound | Weight Percent |
| --- | --- |
| Dipropylene Glycol Monobutyl Ether | 70 |
| ISOPAR L | 8 |
| Propylene Glycol | 12 |
| Isopropyl Alcohol | 5 |
| DOWANOL EB | 5 |

This formulation had good solvating power with the identified paint compound, it was easily applied to the test board, and it dried within approximately the same period of time required to dry the same paint thinned with an equivalent quantity of turpentine. However, it had an LD50 value of >5 gm/kg. The flash point was about 175° F.

EXAMPLE 3

| Compound | Weight Percent |
| --- | --- |
| Dipropylene Glycol Monobutyl Ether | 70 |
| ISOPAR L | 8 |
| Propylene Glycol | 12 |
| Ethyl Alcohol | 10 |

This formulation had good solvating power with the identified paint compound, it was easily applied to the test board, and it dried within approximately the same period of time required to dry the same paint thinned with an equivalent quantity of turpentine. However, it had an LD50 value of >5 gm/kg. The flash point was about 175° F.

EXAMPLE 4

| Compound | Weight Percent |
| --- | --- |
| Dipropylene Glycol Monobutyl Ether | 70 |
| ISOPAR L | 8 |
| Propylene Glycol | 12 |
| Ethyl Alcohol | 5 |
| Linseed Oil | 5 |

This formulation had good solvating power with the identified paint compound, it was easily applied to the test board, and it dried within approximately the same period of time required to dry the same paint thinned with an equivalent quantity of turpentine. However, it had an LD50 value of >5 gm/kg. The flash point was about 175° F.

EXAMPLE 5

| Compound | Weight Percent |
| --- | --- |
| Dipropylene Glycol Monobutyl Ether | 70 |
| ISOPAR L | 8 |
| Propylene Glycol | 12 |
| Ethyl Alcohol | 5 |
| d-limonene | 5 |

This formulation had good solvating power with the identified paint compound, it was easily applied to the test board, and it dried within approximately the same period of time required to dry the same paint thinned with an equivalent quantity of turpentine. However, it had an LD50 value of >5 gm/kg. The flash point was about 175° F.

EXAMPLE 6

| Compound | Weight Percent |
| --- | --- |
| Dipropylene Glycol Monobutyl Ether | 50 |
| ISOPAR L | 8 |
| Propylene Glycol | 12 |
| Linseed Oil | 10 |
| d-limonene | 10 |

This formulation had good solvating power with the identified paint compound, it was easily applied to the test board, and it dried within approximately the same period of time required to dry the same paint thinned with an equivalent quantity of turpentine. It had an LD50 value of <5 gm/kg. The flash point was about 200° F.

EXAMPLE 7

| Compound | Weight Percent |
| --- | --- |
| Dipropylene Glycol Monobutyl Ether | 40 |
| ISOPAR L | 8 |
| Propylene Glycol | 22 |
| Linseed Oil | 12 |
| d-limonene | 10 |
| Exxate 1000 | 8 |

This formulation had good solvating power with the identified paint compound, it was easily applied to the test board, and it dried at a rate approximately 25% slower during the initial drying period than that required to dry the same paint thinned with an equivalent quantity of turpentine. The flash point was about 155° F.

These solvent formulations were found to be particularly useful in thinning a wide variety of oil-based resins, and oil-based artists' paints in particular. As previously noted, thinners for such paints are used in a very wide range viscosity-lowering quantities—from a few drops to as much as 50% by weight of the paint. Of course, this is all a function of the particular user's specific application. In any event, the specific formulations described, as well as the variations noted in the Summary section, have all been found to be suitable for thinning such resins over the range of desirable mix ratios noted. The method used in thinning the resins simply involves mixing the two compounds together until uniform consistency of the mix is achieved.

It has also been observed that these solvent formulations are further suitable for cleaning oil-based resin applicators, including, and in particular, paint brushes. For this purpose an excess of the specific solvent formulation is applied to the item to be cleaned to the point that the oil-based resin clinging to that item is so diluted that it is essentially washed away. Of course, all of the formulations of the present invention are considerably safer than the prior well-known solvents turpentine and mineral spirits when the flash points of the new solvents and the old thinners are compared. In addition, it has been observed that where the solvent formulations of the present invention include less than 60% by weight of a propylene glycol ether or an ethylene glycol ether, those formulations exhibit good solvating power, non-flammability or non-combustibility, and non-toxic characteristics.

While specific embodiments of the present invention have been described in detail herein, it is to be understood that variations, modifications, and equivalents may be made without departing from the spirit and scope of the invention as set forth in the following claims.

I claim:

1. A solvent formulation for diluting resins including oil-based paints, said solvent formulation consisting essentially of:
    a) about 10% to no more than 60% by weight of a glycol ether compound selected from the group consisting of ethylene glycol monomethyl ether, ethylene glycol monobutyl ether, diethylene glycol monomethyl ether, diethylene glycol monobutyl ether, propylene glycol phenyl ether, propylene glycol monomethyl ether, propylene glycol monopropyl ether, dipropylene glycol monopropyl ether, propylene glycol monobutyl ether, and dipropylene glycol monobutyl ether;
    b) about 2% to about 30% by weight of an oil selected from the group consisting of linseed oil, safflower oil, walnut oil, poppyseed oil, and sunflower oil;
    c) about 2% to about 40% by weight of a co-solvent selected from the group consisting of propylene glycol and propylene carbonate; and
    d) 0% to about 10% by weight of N-methyl pyrrolidone.

2. The solvent formulation as claimed in claim 1 further consisting essentially of about 2% to about 20% by weight of a co-solvent selected from the group consisting of isopropyl alcohol and ethyl alcohol.

3. The solvent formulation as claimed in claim 1 further consisting essentially of about 2% to no more than 10% by weight of a $C_{10}$–$C_{12}$ isoalkane.

4. The solvent formulation as claimed in claim 1 further consisting essentially of about 0% to about 10% by weight of an alkyl acetate compound.

5. The solvent formulation as claimed in claim 1 further consisting essentially of about 2% to about 10% by weight of N-methyl pyrrolidone.

6. A solvent formulation for diluting resins including oil-based paints, said formulation consisting essentially of:
    a) about 40% to about 50% by weight of a glycol ether compound selected from the group consisting of ethylene glycol monomethyl ether, ethylene glycol monobutyl ether, diethylene glycol monomethyl ether, diethylene glycol monobutyl ether, propylene glycol phenyl ether, propylene glycol monomethyl ether, propylene glycol monopropyl ether, dipropylene glycol monopropyl ether, propylene glycol monobutyl ether, and dipropylene glycol monobutyl ether;
    b) about 2% to about 30% by weight of an oil selected from the group consisting of linseed oil, safflower oil, walnut oil, poppyseed oil, and sunflower oil;
    c) about 2% to about 40% by weight of a co-solvent selected from the group consisting of propylene glycol and propylene carbonate; and d) about 2% to about 10% by weight of a $C_{10}$–$C_{12}$ isoalkane.

7. The solvent formulation as claimed in claim 4 wherein said alkyl acetate compound is isodecyl acetate.

8. The solvent formulation as claimed in claim 1 further consisting essentially of about 2% to about 30% by weight of d-limonene.

\* \* \* \* \*